W. E. ERWAY.
CHAIN PULLING DEVICE.
APPLICATION FILED MAR. 23, 1920.

1,359,160.

Patented Nov. 16, 1920.
2 SHEETS—SHEET 1.

Inventor
William E. Erway
By Parker & Prochnow
Attorneys

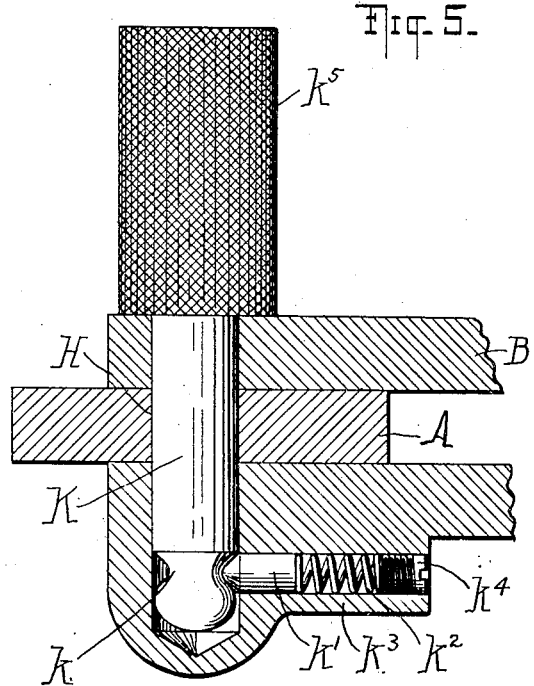

UNITED STATES PATENT OFFICE.

WILLIAM E. ERWAY, OF FORT ERIE, ONTARIO, CANADA.

CHAIN-PULLING DEVICE.

1,359,160.   Specification of Letters Patent.   Patented Nov. 16, 1920.

Application filed March 23, 1920. Serial No. 368,201.

*To all whom it may concern:*

Be it known that I, WILLIAM E. ERWAY, a citizen of the United States, residing at Fort Erie, in the Province of Ontario, Dominion of Canada, have invented a new and useful Improvement in Chain-Pulling Devices, of which the following is a specification.

This invention relates to chain pulling devices of the kind comprising a pair of hooks secured to a lever and adapted to engage the links of a chain and pull the same when the lever is swung back and forth.

The objects of this invention are to provide a chain pulling device of this kind of improved construction which is so made as to insure the proper feeding of the chain from the chain engaging parts of the device; also to provide a device of this kind which is so constructed that the leverage with which the device acts on the chain may be varied; also to provide means for quickly adjusting the device to operate at different leverages or speeds; also to improve the construction of devices of this kind in other respects hereinafter specified.

In the accompanying drawings:

Fig. 3 is a bottom plan view thereof showing the parts of the device in different positions.

Fig. 4 is a transverse sectional view of one of the chain engaging members, on line 4—4 Fig. 3.

Fig. 5 is a fragmentary sectional view thereof on line 5—5 Fig. 1.

Figure 1:
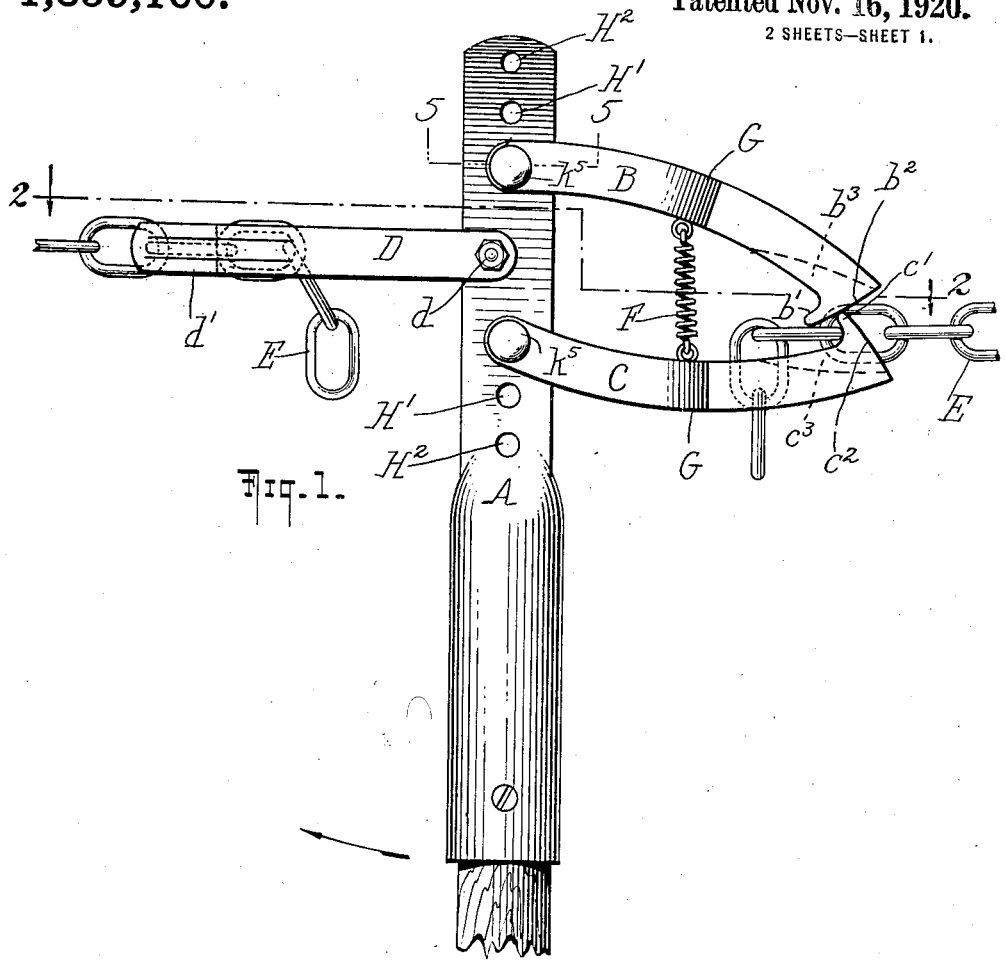
Figure 1 is a top plan view of a chain pulling device embodying the invention.
Figure 2:
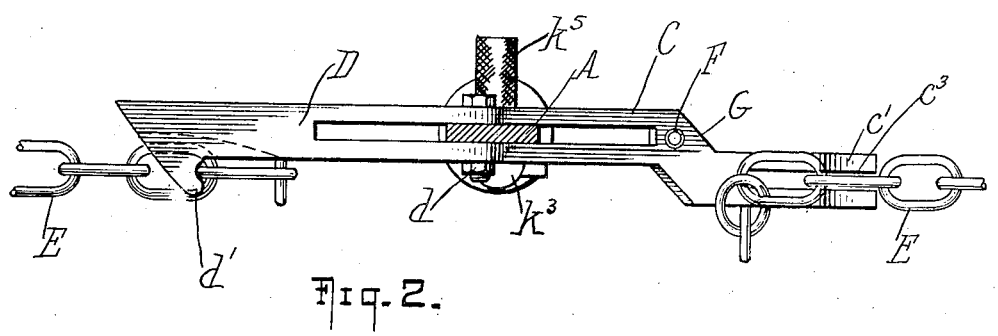
Fig. 2 is a sectional end view thereof on line 2—2 Fig. 1.

The chain pulling device comprises the usual lever $A$ having a pair of chain engaging members $B$, $C$ pivoted thereon and a single fastening or draft member or clevis $D$ which is pivoted to the lever $A$ intermediate between the two chain engaging members $B$ and $C$. $E$ represents the chain or chains with which the device coöperates. The two chain engaging members $B$ and $C$ are yieldingly drawn together by any suitable means such as a spring $F$, and the ends of these members are provided with hooks or chain engaging parts $b'$ and $c'$ adapted to coöperate with the links of a chain. The outer ends or faces of the chain engaging members preferably have inclined faces $b^2$ and $c^2$ which enable the ends of the chain engaging members to slide over the links of the chain and to enter between the links for gripping the chain. The hooked ends of the members $B$ and $C$ are provided with longitudinal slots $b^3$ and $c^3$, into which the alternate links of the chain may enter. The parts of the draft member and chain engaging members which are connected to the lever $A$ are preferably bifurcated, as shown, so that these parts straddle the lever $A$. In devices of this kind, when the lever is swung back and forth about a bolt or pin $d$ which connects the draft member $D$ with the lever, the two hooked ends of the chain engaging members $B$ and $C$ engage with the links of the chain and pull the chain toward the pivot of the draft member. In devices of this kind as heretofore made, the spring $F$ frequently interferes with the feeding of the chain $E$ from the chain engaging members which caused jamming of the device. This defect is overcome in the construction shown in the drawings in the following manner:

Both the chain engaging members $B$ and $C$ are provided at $G$ with offsets or bends, by which arrangement the outer hooked portions $b'$ and $c'$ are out of alinement with the portions of the chain engaging members to which the spring $F$ is connected so that the chain $E$ will feed from the hooked portions without coming into contact with the spring $F$. In order to prevent the offsetting of the chain engaging members $B$ and $C$ from interfering with the operation of the device by binding against the lever, the draft member $D$ is provided with a hook $d'$ or other fastening device which extends in the same direction as the offsets of the chain engaging members $B$ and $C$. By this arrangement the two parts of the chain $E$ will exert a pull in a line parallel to the length of the draft member and of the chain engaging members $B$ and $C$ so that there will be no binding on the pivotal connections of these members with the lever $A$ due to the offsetting of the chain engaging members.

In order to enable the device to operate at different speeds, or in other words to vary the leverage of the device on the chain $E$, a plurality of holes or bearings for the chain engaging members are provided, three such holes being shown in the construction illustrated for each of the chain engaging members and being represented by $H$, $H'$ and H², these holes being arranged at different distances from the fixed pivot $d$ which holds the draft member D to the lever A. When the chain engaging members B and C are pivoted in the holes H, as shown in Figs. 1 and 3, the device is capable of exerting the greatest pull upon the chain, but moves the chain at a comparatively slow speed.

In order to facilitate the changing of the device from one speed to another, a pair of pivot pins K is provided which are so constructed as to be readily removable and replaceable, and which are yieldingly held in their operative positions. For this purpose each of the pins K is provided with an annular groove or notch $k$ into which a pin or detent $k'$ is adapted to enter to yieldingly hold the pivoted pin K in place. In the construction shown the pin $k'$ is yieldingly pressed into its holding position by means of a spring $k^2$ arranged in a hole in an enlarged portion $k^3$ of the chain engaging member, the spring being held in place by means of a screw or the like $k^4$. In order to facilitate the removal of the pin K in its insertion into its operative position, the pin is provided with an enlarged head $k^5$ which is preferably knurled. By means of this construction, in order to change the speed of the device it is only necessary to remove the pin K and to place the holes in the corresponding chain engaging member into alinement with another hole in the lever and again insert the pin into its operative position. Any other means for pivoting the chain engaging members to the lever A may be employed if desired.

The device described is efficient and reliable in operation and simple in construction and makes it possible to exert a powerful pull upon the chain. The chain in the device described feeds freely from the chain engaging members so that the device is not likely to jam or clog. The leverage with which the device acts upon the chain can be easily changed while the device is in operation by changing the pivotal connection of either chain engaging member which is not gripping the chain. The device may be used on a single chain, one end of which is connected with an anchor or stationary part and the other end of which is connected to the part which is to be pulled. In this case the pulling device may be connected with any part of the chain by engaging the hooks $b'$, $c'$ and $d'$ with any of the links of the chain. The device may be used for wire stretching, for pulling loads, or for any other purpose where a pull is required.

I claim as my invention:

1. In a chain pulling device, the combination of a lever, a pair of chain engaging members pivoted to said lever and having their pivots spaced apart, a draft member pivoted to said lever and having its pivot arranged between the pivots of said chain engaging members, and a spring connecting said chain engaging members, the free ends of said chain engaging members being provided with hook shaped parts adapted to engage with the links of a chain, said hook shaped parts being arranged out of alinement with said pivots and said spring, whereby the spring will not interfere with the feeding of the chain from said hooked parts.

2. In a chain pulling device, the combination of a lever, a pair of chain engaging members pivoted to said lever and having their pivots spaced apart, a draft member pivoted to said lever and having its pivot arranged between the pivots of said chain engaging members, and a spring connecting said chain engaging members, the free ends of said chain engaging members beyond said spring being offset and provided with hook shaped ends adapted to engage with the links of a chain, whereby the spring will not interfere with the feeding of the chain from said hooks.

3. In a chain pulling device, the combination of a lever, a pair of chain engaging members pivoted to said lever and having their pivots spaced apart, a draft member pivoted to said lever and having its pivot arranged between the pivots of said chain engaging members and having at its free end a fastening device arranged at one side of said member, said chain engaging members having chain engaging hooks offset at one side of said members and substantially in alinement with said fastening device of said draft member, and a spring connecting said chain engaging members and arranged out of alinement with said fastening device hooks.

4. In a chain pulling device, the combination of a lever, a pair of chain engaging members pivoted to said lever and having their pivots spaced apart, a draft member pivoted to said lever and having its pivot arranged between the pivots of said chain engaging members, a spring connecting said chain engaging members, chain engaging portions on the ends of said chain engaging members, and an attaching device on said draft member, said attaching device and said chain engaging end portions being out of alinement with said spring.

5. In a chain pulling device, the combination of a lever, a draft member pivoted to said lever, a pair of rigid chain engaging members having bifurcated portions straddling said lever and pivotally connected therewith, said connections being oppositely disposed with respect to the pivot of said draft member, and means for varying the distance between said pivotal connections and the pivot of said draft member to vary the amount of travel of said chain engaging members when said lever is swung about the pivot of said draft member.

6. In a chain pulling device, the combination of a lever, a draft member pivoted to said lever, a pair of rigid chain engaging members having pivotal connections with said lever, a spring connecting said members at a distance from said pivotal connections, said lever having a plurality of holes extending through said lever and arranged at opposite sides of the pivot of said draft member and at different distances therefrom, and means adapted to extend through any of said holes for pivotally connecting said chain engaging members to said lever, whereby the travel of said chain engaging members may be varied.

7. In a chain pulling device, the combination of a lever, a draft member pivoted to said lever, a pair of chain engaging members, said lever having a plurality of holes in each side of said pivot, a pin adapted to extend through said holes and through holes in said chain engaging members, and means on said chain engaging members for yieldingly holding said pin in operative relation to said chain engaging members and lever.

8. In a chain pulling device, the combination of a lever, a draft member pivoted to said lever, a pair of chain engaging members, said lever having a plurality of holes in each side of said pivot, a pivot pin adapted to extend through said holes and through holes in a chain engaging member, and a detent pin adapted to enter a notch in said pivot pin for yieldingly holding said pivot pin in its operative position.

9. In a chain pulling device, the combination of a lever, a draft member pivoted to said lever, a pair of chain engaging members, said lever having a plurality of holes in each side of said pivot, a pivot pin adapted to extend through said holes and through holes in a chain engaging member, a latch arranged on said chain engaging member and adapted to enter a recess on said pivot pin for yieldingly holding said pin in its operative position, and a spring for yieldingly holding said latch in engagement with said pivot pin.

Witness my hand this 20th day of March, 1920.

WILLIAM E. ERWAY.

Witnesses:
CAROLINE M. P. ERWAY,
F. E. PROCHNOW.